US012055310B2

(12) United States Patent
Ramasamy et al.

(10) Patent No.: US 12,055,310 B2
(45) Date of Patent: Aug. 6, 2024

(54) HVAC THERMOSTAT ASSEMBLY AND WALL-PLATE CONNECTOR

(71) Applicant: Lennox Industries Inc., Richardson, TX (US)

(72) Inventors: Surendran Ramasamy, Chennai (IN); Stephen J. Vendt, Lewisville, TX (US); Mohan Renganathan, Chennai (IN); Aravind Sridharan, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 233 days.

(21) Appl. No.: 17/884,543

(22) Filed: Aug. 9, 2022

(65) Prior Publication Data

US 2024/0053040 A1 Feb. 15, 2024

(51) Int. Cl.

*F24F 11/52* (2018.01)
*F24F 11/30* (2018.01)
*H01R 13/506* (2006.01)
*H01R 13/516* (2006.01)

(52) U.S. Cl.

CPC .............. *F24F 11/52* (2018.01); *F24F 11/30* (2018.01); *H01R 13/506* (2013.01); *H01R 13/516* (2013.01)

(58) Field of Classification Search

CPC .......... F24F 11/52; F24F 11/523; F24F 11/89; F24F 11/30; H01R 3/506; H01R 3/516; H01R 3/741

See application file for complete search history.

(56) References Cited

U.S. PATENT DOCUMENTS

| | | | | |
|---|---|---|---|---|
| D733,591 | S | 7/2015 | Golden et al. | |
| D734,179 | S | 7/2015 | Golden et al. | |
| 9,857,090 | B2 | 1/2018 | Golden et al. | |
| 10,088,188 | B2 | 10/2018 | Vendt et al. | |
| 10,782,039 | B2 | 9/2020 | Golden et al. | |
| 2013/0099010 | A1* | 4/2013 | Filson | F24F 11/58 236/1 C |
| 2014/0277770 | A1* | 9/2014 | Aljabari | H02H 9/005 700/278 |
| 2014/0324229 | A1* | 10/2014 | Leen | G05D 23/19 700/276 |
| 2017/0234569 | A1* | 8/2017 | Emmons | H01R 9/2491 361/809 |
| 2017/0237215 | A1* | 8/2017 | Barton | H01R 33/955 29/854 |
| 2020/0116370 | A1* | 4/2020 | Read | F24F 11/58 |
| 2020/0116378 | A1* | 4/2020 | Heintzelman | F24F 11/523 |
| 2021/0271273 | A1* | 9/2021 | McMurray | F24F 11/58 |
| 2021/0396410 | A1* | 12/2021 | Emmons | F24F 11/63 |

* cited by examiner

*Primary Examiner* — Marc E Norman
(74) *Attorney, Agent, or Firm* — Johnston IP Law, PLLC

(57) ABSTRACT

An HVAC thermostat assembly has a wall-plate connector that includes a wall-plate and wire connectors as a whole that allows for a thinner, more aesthetic design. In one instance, the HVAC thermostat includes a display unit with a wall-plate connector recess having a plurality of electrical connector pins extending outward to mate with a wall-plate connector. The wall-plate connector includes a wall plate with incorporated electrical terminals. Other assemblies and systems are disclosed.

20 Claims, 7 Drawing Sheets

HVAC THERMOSTAT ASSEMBLY AND WALL-PLATE CONNECTOR

TECHNICAL FIELD

This application is directed, in general, to heating, venting, and air conditioning (HVAC), and more specifically, to HVAC thermostat assemblies and thermostat wall-plate connectors.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Heating, ventilation, and sit conditioning (HVAC) systems are used to regulate temperatures in various facilities. A thermostat is used within an HVAC system to assist in automating the indoor temperature regulation. The thermostat may turn on or off the cooling, heating, or air circulation system based on the temperature of the air and the user settings. Thermostats are typically electronic devices mounted to the outside surface of a wall. They are both functional and aesthetic. Improvements remain desirable.

SUMMARY

According to an illustrative embodiment, a heating, ventilation, and air-conditioning (HVAC) thermostat assembly has a wall-plate connector that includes a wall-plate and also wire connectors that as a whole allow for a thinner, more aesthetic design. In one instance, the HVAC thermostat includes a display unit with a wall-plate connector recess having a plurality of electrical connector pins extending outward to mate with a wall-plate connector. The wall-plate connector includes a wall plate with incorporated electrical terminals.

According to an illustrative embodiment, a HVAC thermostat assembly includes a display unit having a first side and a second side. The first side of the display unit is configured to have a screen for presenting a graphical user interface to a user for receiving control inputs and displaying data. The second side of the display unit includes a wall-plate-connector recess having a plurality of electrical connection pins extending outward therefrom. The second side of the display unit also includes a first snap retention wall extending from the second side and having a first lip at a distal end that extends orthogonal to a main portion of the first snap retention wall. The second side of the display unit also includes a second snap retention wall extending from the second side and having a second lip at a distal end that extends orthogonal to a main portion of the second snap retention wall. The first lip and second lip extend towards each other and are flexible enough to allow a latching motion.

The HVAC thermostat assembly also includes a wall-plate connector. The wall-plate connector portion has a connector body with a first side and second side. The first side of the wall-plate connector couples with the display unit, which has a plurality of electrical connection pins, and the second side is for placing against a wall onto which the wall-plate connector is to be coupled. The connector body is substantially flat on at least the second side. The connector body has a first fastener aperture and a second fastener aperture through it for receiving a first fastener and a second fastener, both of which are coupled to the wall when in an installed position. The wall-plate connector has a connector extension that extends from the first side of the connector body and is formed with a plurality of terminal pockets.

The wall-plate connector further includes a plurality of electrical terminals disposed and coupled in the terminal pockets. Each electrical terminal has a wire-entrance aperture. The connector extension is formed with a plurality of pin apertures that open into a plurality of pin cavities that are electrically coupled to the plurality of electrical terminals. Each pin aperture is for receiving one of the plurality of electrical connection pins from the display unit that extends through the pin aperture and into the pin cavity of a corresponding electrical terminal. The connector body has a first lateral edge and a second lateral edge. The first lateral edge is formed with a first snap cavity, and the second lateral edge is formed with a second snap cavity. Upon installation, the first snap retention wall engages the first snap cavity of the connector body and the second snap retention wall engages the second snap cavity of the connector body.

According to another illustrative embodiment, a HVAC thermostat wall-plate connector includes a connector body having a first side and second side. The first side is sized and configured to couple with a display unit, which has a plurality of electrical connection pins, and the second side is for placing against a wall onto which the wall-plate connector is to be coupled. The connector member is substantially flat on at least the second side.

The wall-plate connector further includes a first fastener aperture through the connector body for receiving a first fastener that is coupled to the wall when in an installed position and a second fastener aperture through the connector body for receiving a second fastener that is coupled to the wall when in an installed position.

The wall-plate connector also includes a connector extension extending from the first side of the connector body and formed with a plurality of terminal pockets. A plurality of electrical terminals is disposed within the terminal pockets and coupled therein. Each electrical terminal has a wire-entrance aperture. The connector extension is formed with a plurality of pin apertures opening into a plurality of pin cavities, each pin aperture for receiving an electrical pin from a display unit that extends through the pin aperture and into a corresponding member of the plurality of pin cavities, which is electrically coupled to a corresponding member of the plurality of electrical terminals. In some embodiments, a connector body is formed with a notch wire chase on a peripheral edge of the connector body. Other assemblies, systems, and devices are disclosed herein.

DESCRIPTION OF THE DRAWINGS

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
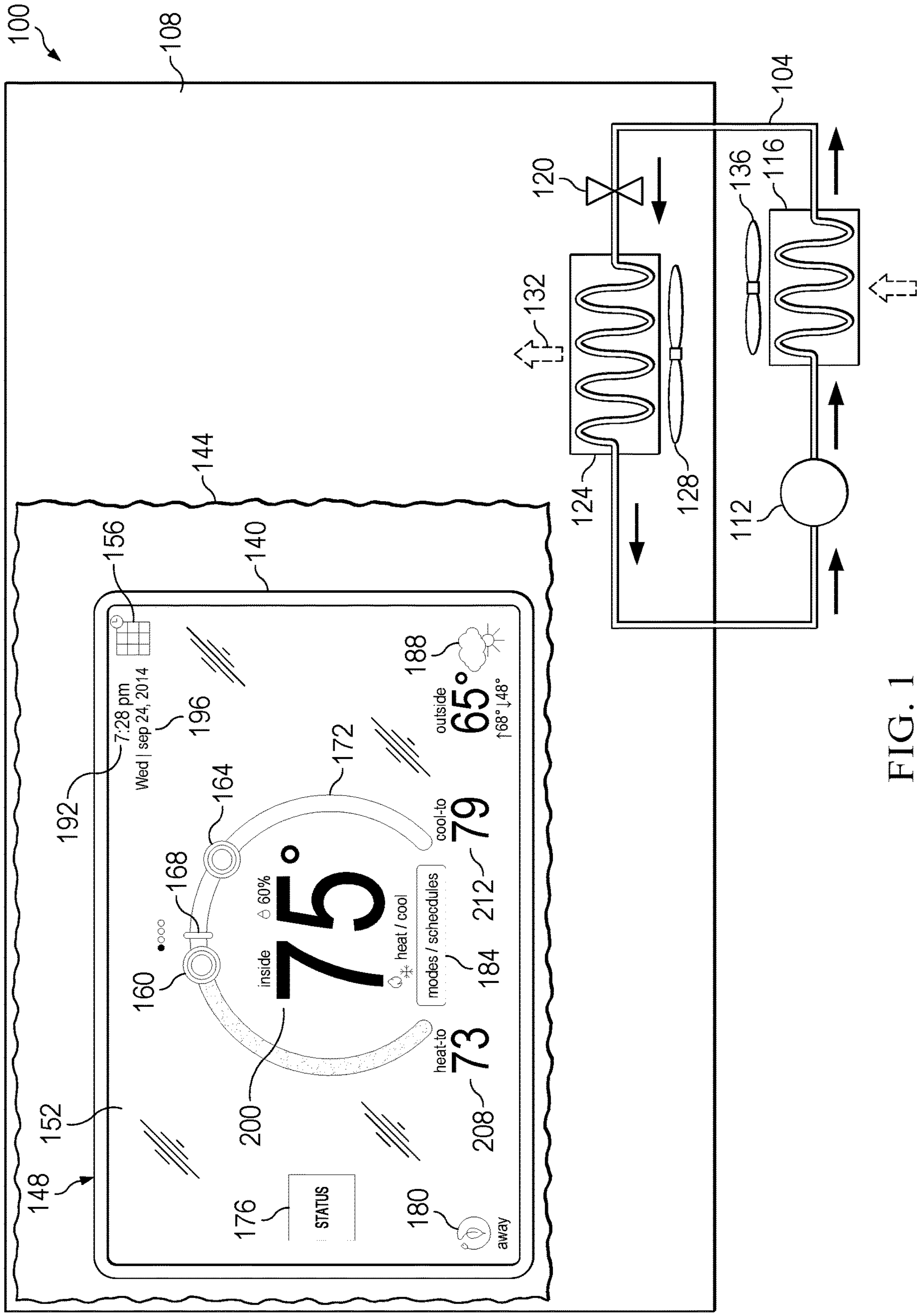
FIG. 1 is a schematic diagram of an HVAC system according to an illustrative embodiment.

Referring now to the figures and initially to FIG. 1, an illustrative HVAC system 100 is presented. The HVAC system 100 includes a closed-conduit circuit 104 containing a refrigerant, or working fluid, the HVAC system 100 may include elements that will allow the HVAC system to cool or heat air before returning it to an interior space. The HVAC system may include a compressor 112 that is fluidly coupled to the closed-conduit circuit 104. A condenser 116 is also fluidly coupled to the closed-conduit circuit 104. An expansion valve 120 is fluidly coupled to the closed-conduit circuit 104 upstream of an evaporator 124, a fan 128 may move air across the evaporator 124 that is delivered as conditioned air 132 in the interior space 108. Another fan 136 may be included to move air across the condenser 116 to help cool the refrigerant therein.

The HVAC system 100 may include a controller for controlling at least one of the compressors 112, condenser 116, expansion valve 120, evaporator 124, or fans 128, 136. The controller may take the form of a smart thermostat 140, which may be mounted on a wall 144. The thermostat 140 has a display unit 148 that includes a screen 152 providing a graphical user interface to receive input from a user as well as to display data. In one embodiment, the display unit 148 has a longitudinal length of 179 mm and a vertical length of 113.5 mm, and a lateral or width of 18.5 mm. In one illustrative embodiment, the wall-plate connector recess 344 has a longitudinal length of 51 mm and a vertical dimension of 33 mm. Those skilled in the art will appreciate that other dimensions may be used.

The display screen 152 may be used to manage temperature settings of the programmable intelligent thermostat 140. In a typical embodiment, the screen 152 may be accessible to a user by tapping on the display screen 152. The screen 152 includes a menu tab 156, a heat set-point control 160, a cool set-point control 164, an indoor temperature bar 168, and a temperature scale 172. In a typical embodiment, the temperature scale 172 is substantially horseshoe-shaped and is positioned towards a central region of the screen 152. In other embodiments, the substantially horseshoe-shaped temperature scale 172 can be positioned at any location on the screen 152. The heat set-point control 160, the cool set-point control 164, and the indoor temperature bar 168 are positioned on the temperature scale 172.

The screen 152 further includes a status tab 176, an away tab 180, and a modes/schedule-selection tab 184. The screen 152 is configured to display present-day information such as, for example, outside temperature 188, current time 192, day/date/year 196, and the like. For exemplary illustration, location of the present-day information such as, for example, outside temperature 188, current time 192, day/date/year 196 as demonstrated in FIG. 1 is exemplary; however, in other embodiments, the present-day information such as, for example, outside temperature 188, current time 192, day/date/year 196 may be at any location on the user-interface screen 152.

The screen 152 is further configured to display, within the substantially horseshoe-shaped temperature scale 172, a digital numerical representation of indoor temperature 200 and indoor humidity 204. The screen 152 further displays temperature setpoints such as, for example, a heat-to temperature setpoint 208 and a cool-to temperature setpoint 212.

Figure 2:
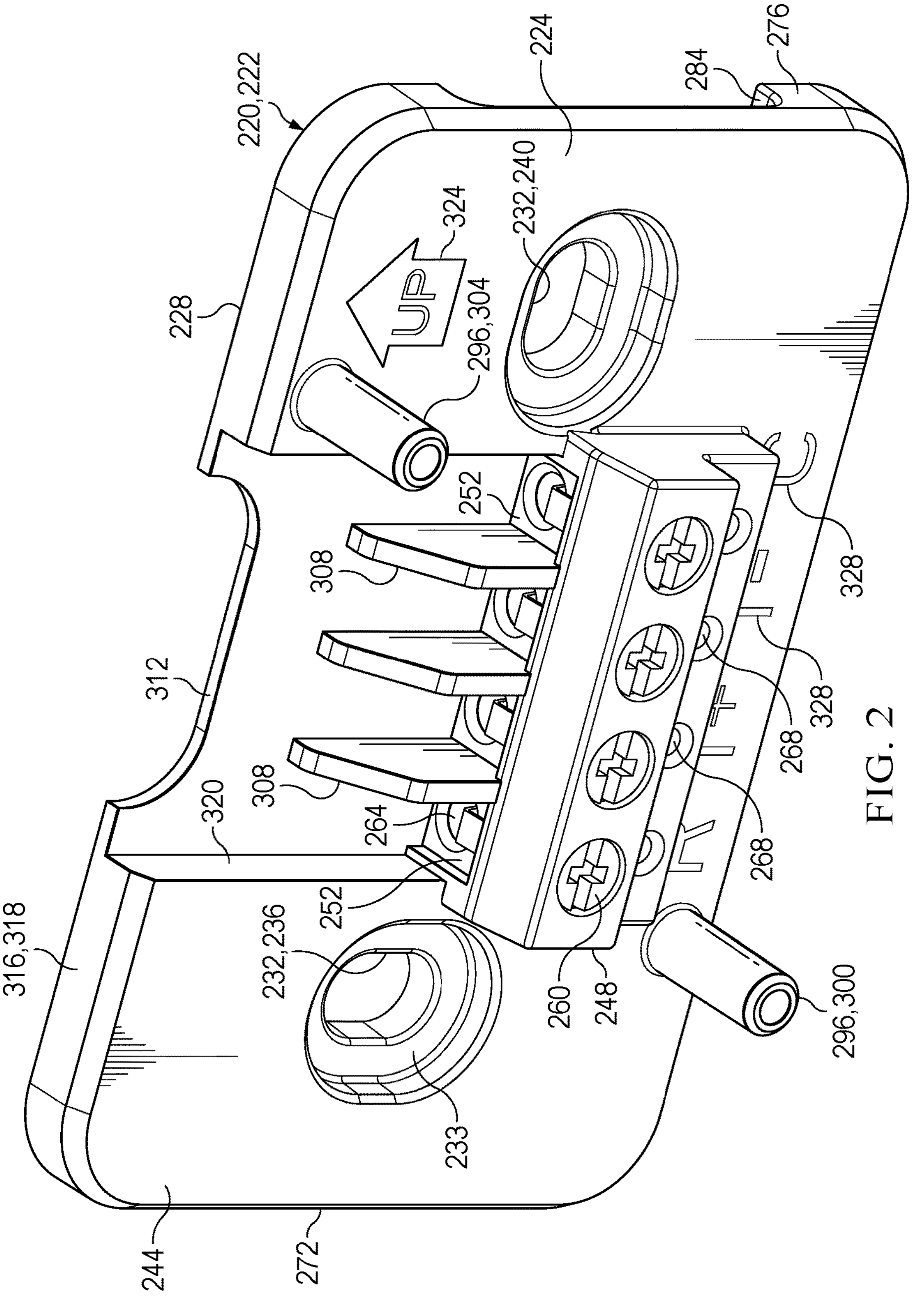
FIG. 2 is a schematic perspective view of a wall-plate connector according to an illustrative embodiment.

In providing the thermostat 140 for the user in the conditioned space, the thermostat 140 is removably coupled to the wall 144. The thermostat 140 includes the display unit 148 and a wall-plate connector 220 (FIG. 2). The wall-plate connector 220 includes a connector body 222. The connector body 222 is formed from plastic or any non-conductive insulated materials. It may be formed by injection molding or other techniques. The connector body 222 has a first side 224 and second side 228. The wall-plate connector 220 receives fasteners that go into the wall to hold the wall-plate connector 220 into the wall and then the display unit 148 is releasably coupled to the wall-plate connector 220. Referring now primarily to FIG. 2, the wall-plate connector 220 has a first side 224 and a second side 228. The first side 224 is sized and configured to couple with the display unit 148. The second side 228 is for placing against a wall 144 onto which the wall-plate connector 220 is to be coupled. The connector body 222 is substantially flat, at least on the second side 228.

The connector body 222 is formed with one or more fastener apertures 232, such as first fastener aperture 236 and second fastener aperture 240. Those skilled in the art will appreciate that various numbers of faster aperture 232 might be used in different embodiments. Each fastener aperture 232 may include a counter-sink 233 to allow the head of a fastener to be substantially below the planar portion 244 to avoid fastener interference with the rear housing. Wherein attaching the wall-plate connector 228 to the wall 144, a fastener is applied through the fastener apertures 232 and into the wall. The fastener apertures 232 may be formed having an oblong shape to allow some movement of the wall-plate connector 220. For example, the first fastener aperture 236 is oblong in a vertical direction, allowing some movement on that end of the of the wall-plate connecter 220, and the second fastener aperture 140 is oblong and horizontal direction to allow horizontal movement of the wall-plate connector 220 during installation.

The first side 224 of the connector body 222 has a portion with a planar surface 244. The connector body 222 further includes a connector extension 248 that protrudes from the planar surface 244 in the direction where the display unit 148 will reside when in an installed position. The connector extension 248 is formed with a plurality of terminal pockets 252 into which a plurality of electrical terminals 256 are disposed and coupled. The plurality of electrical terminals 256 may be coupled and held in position by set screws or fasteners 260. Each of the electrical terminals 256 is formed with a wire-entrance aperture 264 and input wire (not explicitly shown) has a portion that enters into the wire-entrance aperture 264 and then is secured therein by the set screw 260.

Figure 7:
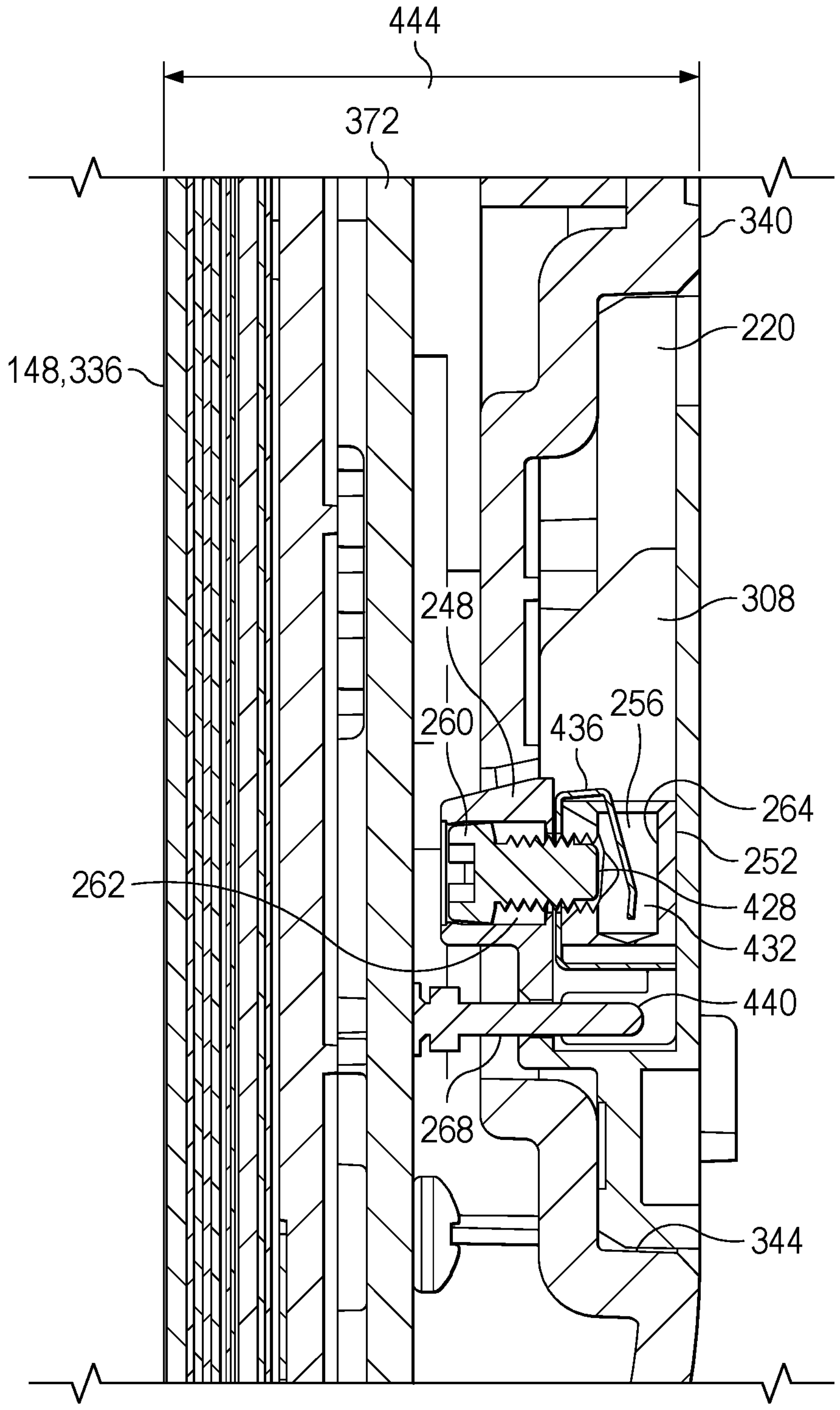
FIG. 7 is a schematic cross-section of an HVAC thermostat assembly showing an illustrative embodiment of the display unit releasably coupled with an illustrative embodiment of a wall-plate connector.

The connector-extension 248 is formed with a plurality of pin apertures 268 for receiving a plurality of electrical connection pins 388 (see FIG. 5) when in the installed position with the display unit 148. As will be described in connection with FIG. 7, the plurality of pin apertures 268 extend and open into a corresponding member of a plurality of pin cavities 440 (FIG. 7). Each of the plurality of pin apertures 268 is for receiving one of the plurality of electrical connection pins 388 from the display unit 148 that extends through the corresponding pin aperture 268 and into the corresponding pin cavity 440, which is electrically coupled to a corresponding electrical terminal 256. The connector body 222 has a first lateral edge 272 and a second lateral edge 276. The first lateral edge 272 is formed with a first snap cavity 280 (FIG. 3) and a second snap cavity 284. When in an installed position, a portion of a first snap retention wall 288 (FIG. 5) will engage the first snap cavity 280 and a portion of a second snap retention wall 292 (FIG. 5) will engage the second snap cavity 284.

The first side 224 of the connector body 222 may include one or more alignment posts 296 such as first alignment post 300 and second alignment post 304. The alignment posts 296 may be of uniform diameter or uniform cross-section and may take various cross-sectional shapes such as circular, triangles, square, polygonal, rectangular, etc. The alignment posts 296 may be solid or shallow or may have openings. The alignment posts 296 may have a longitudinal length that is longer than the electrical connection pins 388 (FIG. 5) in order to safeguard the electrical connection pins 388 during mating of the display unit 148 and the wall-plate connector 220. The connector body 222 may be formed with a plurality of barrier walls 308 that extend from the first side 224 and are positioned between members of the plurality of terminal pockets 252 to form channels for input wires. This may organize the wires and further protect them from shorts in different circumstances.

The connector body 222 may be formed with a wire-chase notch or opening 312 formed on a first longitudinal edge 316 of the connector body 222, which is formed on a peripheral edge 318. The wire-chase notch 312 may be formed as a flattened U-shape or other shapes. The wire-chase notch 312 may be formed above the plurality of terminal pockets 252 for the orientation shown in FIG. 2. Input wires exiting wall 144 (FIG. 1) can extend through the wire-chase notch 312 and down to the corresponding electrical terminal 256 in the terminal pockets 252. The notch is preferably in a location when mated with the display unit 148, it will minimize exposure of humidity or conditions from the wall to any of the internals of the display unit 148. The connector body 222 may be formed with a wire recess area 320 that provides an area for the wires that is below the planar portion 244 that is closest to the display unit 148 when installed. This is seen clearly in FIG. 2. The wall-plate connector 222 may include visual indicia 324, indicating direction for installation and visual indicia 328 indicating wire types for the various electrical terminals 256. The visual indicia 324, 328 may be engraved.

Figure 3:
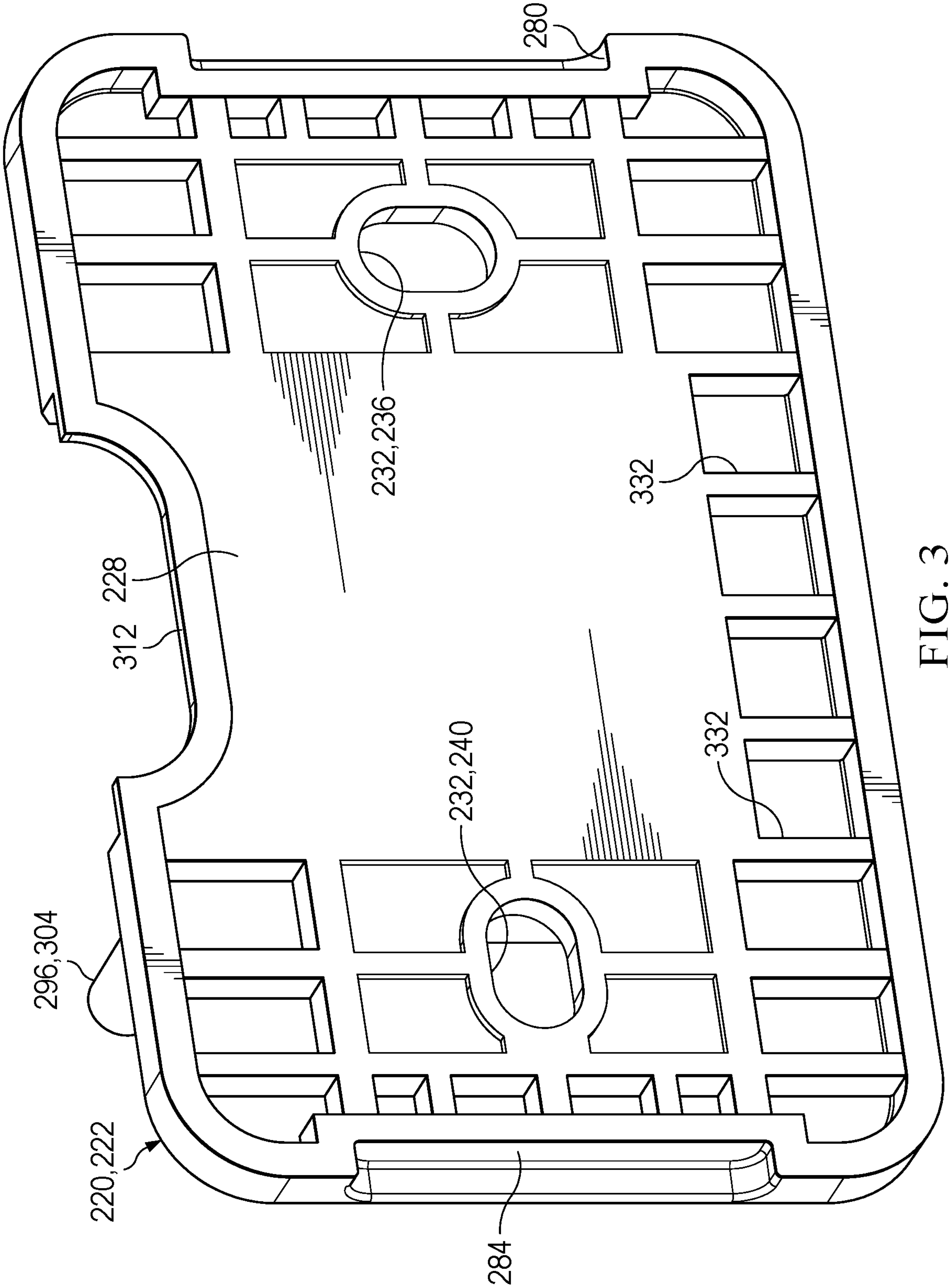
FIG. 3 is a schematic perspective view of a second side of the wall-plate connector of FIG. 2 according to an illustrative embodiment.

Referring now primarily to FIG. 3, the second side 228 of the connector body 222 of the wall-plate connector 220 is shown. The second side 228 is substantially planar to go against the wall 144 (FIG. 1). The second side 228 may be formed with a plurality of strengthening ribs 332.

Figure 4:
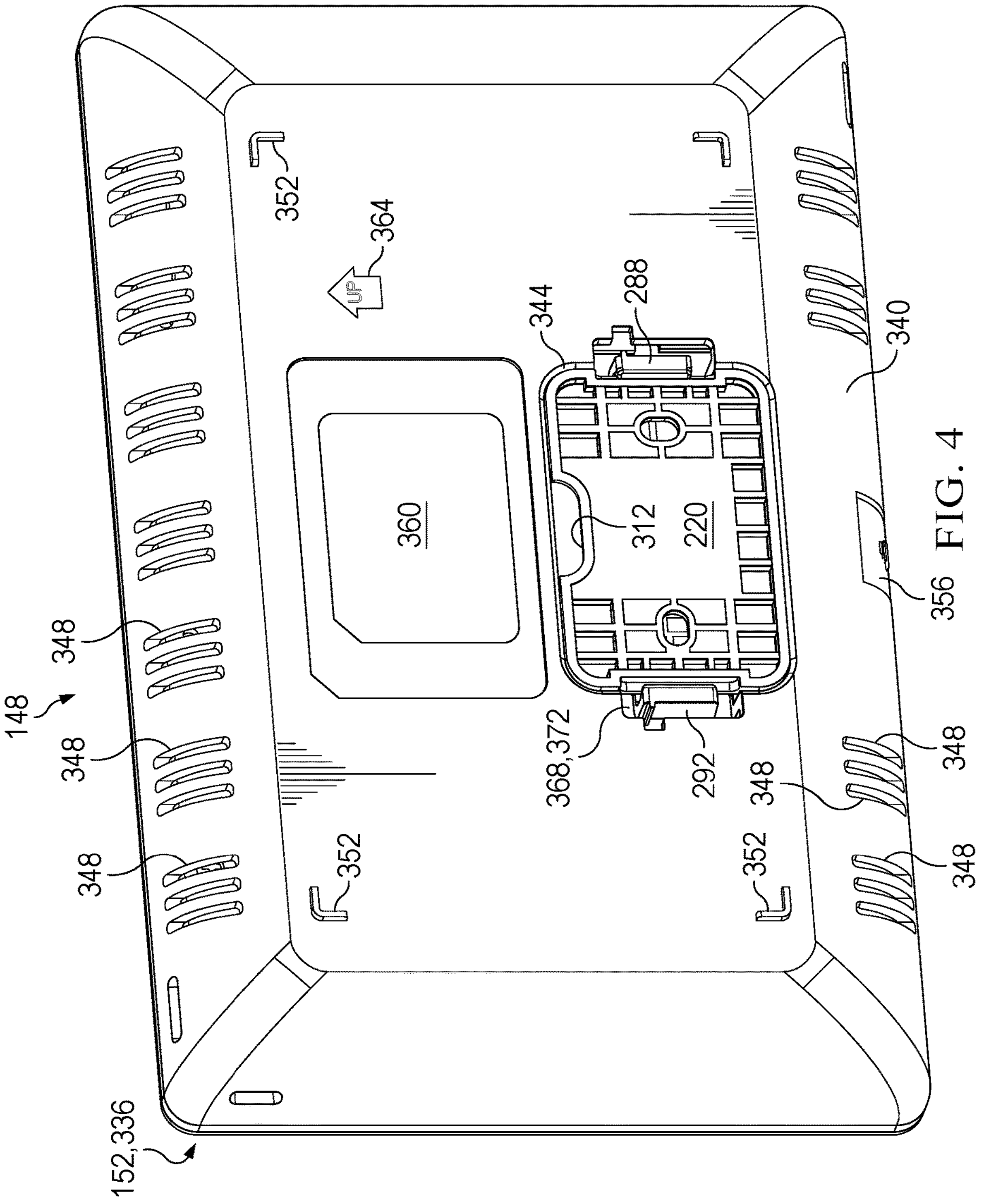
FIG. 4 is another schematic illustrative perspective view of one side of a display unit of an HVAC thermostat according to an illustrative embodiment with a wall-plate connector attached.
Figure 5:
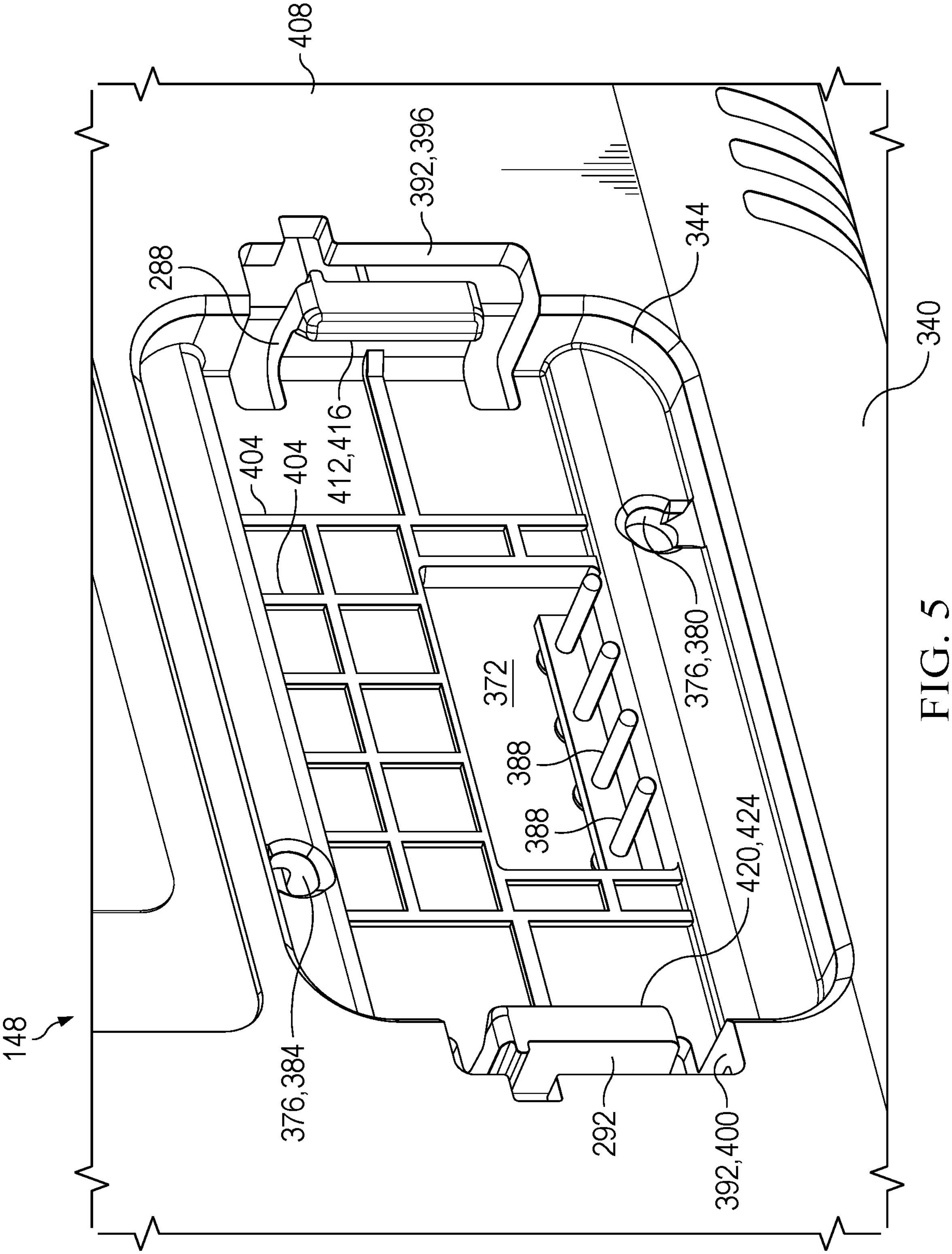
FIG. 5 is a schematic perspective view of a detail of the display unit of FIG. 4 according to an illustrative embodiment shown without the wall-plate connector attached.

Referring now to FIGS. 4 and 5, an illustrative embodiment of a display unit 148 is presented. The display unit 148 has a first side 336 and a second side 340. The first side 336 contains the screen 152 as shown best in FIG. 1. The second side 340 is made to go against the wall and has a wall-plate-connector recess 344 that is sized and configured to receive the wall-plate-connector 220 as will be described. FIG. 4 shows for illustration purposes the wall-plate connector 220 in an installed position an FIG. 5 shows the wall-plate connector recess 344 without the wall-plate connector 220 in position.

Referring primarily to FIG. 4, the second side 340 of the display unit 148 has a plurality of vents 348, a plurality of off-set projections 352, and a USB access port 356. The display unit 148 includes a product label 360 and visual indicia 364 indicating the proper direction for mounting. When an interior 268 of the display unit 148, there are one are more printed circuit boards (PCB) 372. As shown best in FIG. 4, one can see that the wire-chase notch 312 abuts or substantially aligns with a portion of the second side of the display unit 148 that is in the wall-plate connector recess 344 and thereby helps to isolate or minimize any exposure of drafts or humidity or things that might be coming from the wall where the input wires exit the wall.

Referring now primarily to FIG. 5, a detailed portion of the display unit 148 is shown that is focused on the wall-plate connector recess 344. The second side 240 of the display unit 148 includes a plurality of alignment post receptacles 376, such as first alignment post receptacle 380 and second alignment post receptacle 384. With reference to FIGS. 2 and 5, the first alignment post 300 mates with or enters the first alignment post receptacle 380. Likewise, the second alignment post 304 lines up or enters the second alignment post receptacle 384. A plurality of electrical connection pins 388 extend outward form the PCB 372 and are sized and configured to mate with the plurality of pin apertures 268 and pin cavities 440 (see FIG. 7). The alignment posts 286 may be side to be a longer longitudinal length than the electrical connection pins 388 in order to makes sure the pins 388 are not injured during the mating process during a misalignment. The first snap retention wall 288 extends from the wall-plate connector recess 344 and likewise, the second snap-retention wall 292 extends form the wall-plate connector recess 344. To allow movement, a small amount of flexibility is realized by the snap-retention walls 288, 292; each may include a retention-wall cut-out, such as first retention wall cut-out 396 and second retention-wall cut-out 400. The wall-plate connector recess 344 mays include a plurality of strengthening ribs 404.

The wall-plate connector recess 344 may be recessed from a planar portion 408 of the second side 340 of the display unit 148. The first snap retention wall 288 and the second snap-retention wall 292 are flexible enough to allow a latching motion whereby they extend away from each other and then snap or pop back into place to hold something there between. In one illustrative embodiment, the first snap-retention wall 288 includes a lip 412 on a distal end 416. Likewise, the second snap-retention wall 292 includes a lip 420 on a distal end 424. The lips 412, 420, face each other and when the snap-retention walls 288, 292, are moved away from each other, the flexible nature of the material urges them back towards a vertical position or back towards each other whereby they can pinch or hold something therebetween. The lips 412, 420 are sized and configured to engage the first snap-cavity 280 and the second snap-cavity 284, respectively.

Figure 6:
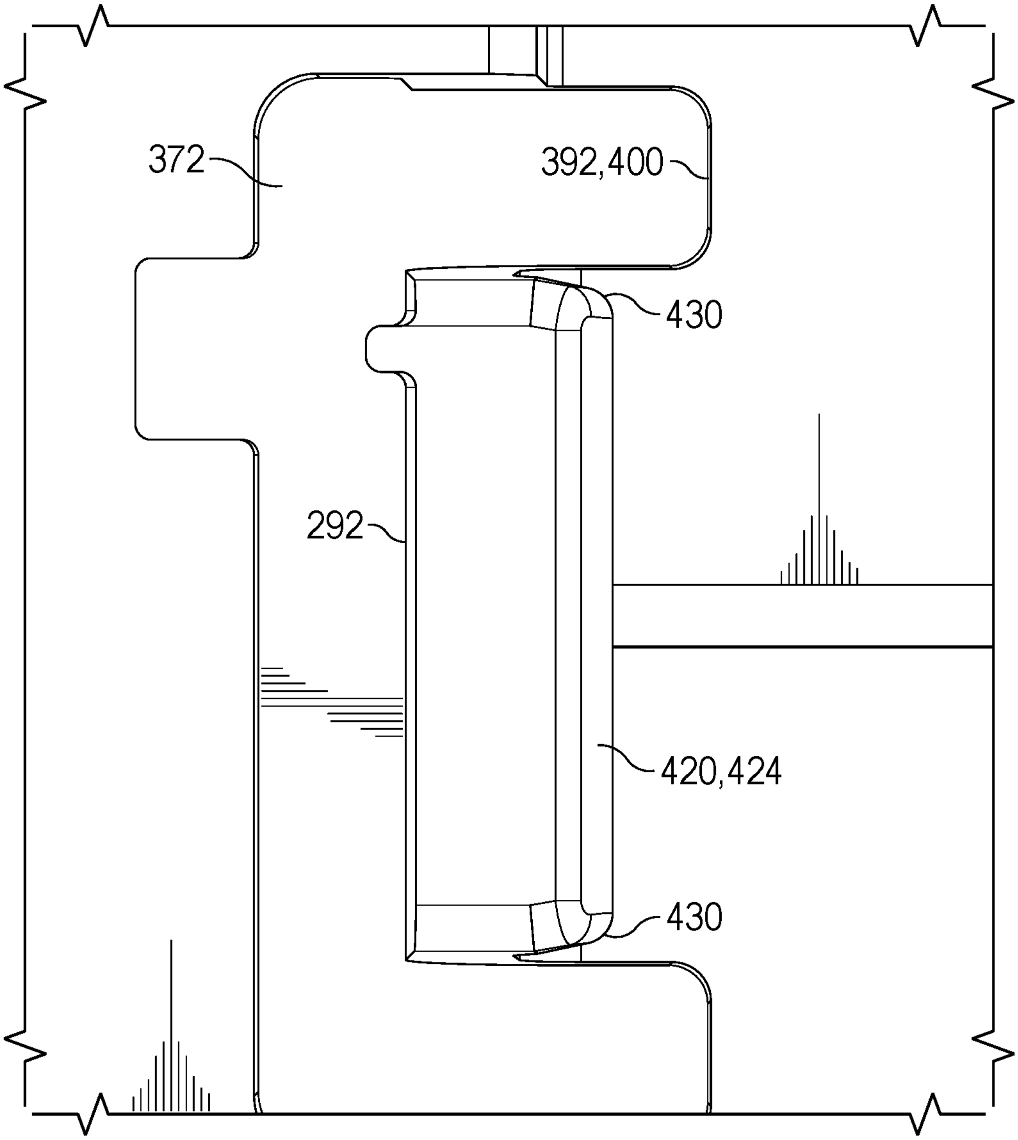
FIG. 6 is a schematic plan view of a detail of a snap retention wall holding a portion of a wall-plate connector in place according to an illustrative embodiment.

As shown clearly in FIG. 6, each of the snap-retention walls 288,292, are formed with curves/rounded portion 430 where the perimeter of the snap-retention wall is brought towards a middle point slightly so that when a person wants to remove the wall-plate connector 220 form its engagement with the display unit 148, a slight rotation movement can be used to help pry the snap retention walls away from each other.

The set screw 260 extends into the connector extension 248 through a screw aperture 262 (FIG. 7). In this view, the set screw 260 extends through the set crew aperture 262, to have a distal end of the screw 428 extend into a wire receptacle 432 in which an input wire resides (not explicitly shown) and that particularly can push a portion of a wire string 436 against the wire to make electrical contact and the wire string 436 electrically couples to one of a plurality of pin cavities 440. In this view, one may see that when the display unit 148 has moved onto the wall-plate connector 220, the plurality of electrical connection pins 338 enter into the plurality of pin apertures 268 and further extend into the plurality of pin cavities 440 where an electrical connection is made with the pin and thereby to the corresponding input wire associated with that particular electrical terminal 256.

Because the electrical terminals 256 are incorporated into the wall-plate as a unitary device, the lateral dimension 444 between the first side 336 of display unit 148 to the second side 228 of the connector body 222 of the wall-plate connector 220 is reduced form other designs. In one illustrative embodiment, the lateral dimension 144 is in the range of 0.5-0.9 inches and in another embodiment is less than 0.75 inches.

While not shown, in some embodiments, a rubber gasket member (or other gasket material member) may be disposed in the wall-plate connector recess 344 between the connector body 222 and the display unit 148. The rubber gasket may be shaped like the wall-plate connector recess 344 with cutouts around the alignment post receptacles 376, the plurality of connection pins 388, or wire-chase notch or opening 312.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. An HVAC thermostat assembly comprising:

a display unit having a first side and a second side;

wherein the first side of the display unit has a screen for presenting a graphical user interface to a user for receiving control inputs and displaying data;

wherein the second side of the display unit comprises:

a wall-plate-connector recess having a plurality of electrical connection pins extending outward therefrom, a first snap retention wall extending from the second side, a second snap retention wall displaced from the first snap retention wall and extending from the second side, and wherein the first snap retention wall and the second snap retention wall are flexible enough to allow a latching motion;

a wall-plate connector comprising:

connector body having a first side and second side, wherein the first side is sized and configured to couple with the display unit and the second side is for placing against a wall onto which the wall-plate connector is to be coupled, wherein the connector body is substantially flat on at least the second side, one or more fastener apertures through the connector body for receiving one or more fasteners, a connector extension extending from the first side of the connector body and formed with a plurality of terminal pockets, a plurality of electrical terminals disposed within the terminal pockets and coupled therein, each electrical terminal having a wire-entrance aperture, wherein the connector extension is formed with a plurality of pin apertures opening into a plurality of pin cavities, each of the plurality of pin apertures for receiving one of the plurality of electrical connection pins from the display unit that extends through the corresponding pin aperture of the plurality of pin apertures and into the corresponding pin cavity of the plurality of pin cavities that is electrically coupled to a corresponding electrical terminal of the plurality of electrical terminals, wherein the connector body has a first lateral edge and a second lateral edge, and wherein the first lateral edge is formed with a first snap cavity and the second lateral edge is formed with a second snap cavity, and wherein, in an installed position, the first snap retention wall engages the first snap cavity of the connector body, and the second snap retention wall engages the second snap cavity of the connector body.

2. The HVAC thermostat assembly of claim 1, further comprising a plurality of alignment posts coupled to and extending from the first side of the connector body.

3. The HVAC thermostat assembly of claim 1, further comprising a plurality of barrier walls extending from the first side of the connector body between members of the plurality of terminal pockets.

4. The HVAC thermostat assembly of claim 1, wherein the one or more fastener apertures is oblong in shape.

5. The HVAC thermostat assembly of claim 1, wherein the first snap retention wall has rounded corners and the second snap retention wall has rounded corners.

6. The HVAC thermostat assembly of claim 1, wherein the connector body is formed with a notch wire chase on a peripheral edge of the connector body.

7. The HVAC thermostat assembly of claim 1, wherein a dimension from an exterior of the first side of the display unit to the second side of the wall-plate connector is between 0.50 and 0.80 inches.

8. The HVAC thermostat assembly of claim 1, wherein a dimension from an exterior of the first side of the display unit to the second side of the wall-plate connector is less than 0.75 inches.

9. The HVAC thermostat assembly of claim 1, further comprising a plurality of alignment posts coupled to and extending from the first side of the connector body, and wherein the plurality of alignment posts is longer than a longitudinal dimension by which the plurality of electrical connection pins extend from the wall-plate-connector recess of the display unit.

10. The HVAC thermostat assembly of claim 1, further comprising a plurality of alignment posts coupled to and extending from the first side of the connector body;

further comprising a plurality of barrier walls extending from the first side of the connector body between members of the plurality of terminal pockets;

wherein the at least one fastener aperture is oblong in shape;

further comprising a plurality of terminal-fastener apertures formed through a portion of the connector extension and aligning with a portion of a corresponding electrical terminal to couple a wire therein;

further comprising a notch wire chase that has a flattened U-shape on a top longitudinal edge; and wherein the plurality of alignment posts is longer than a longitudinal dimension by which the plurality of electrical connection pins extend from wall-plate-connector recess of the display unit.

11. A wall-plate connector for use in an HVAC system, the wall-plate connector comprising:

a connector body having a first side and second side, wherein the first side is sized and configured to couple with a display unit having a plurality of electrical connection pins and the second side is for placing against a wall onto which the wall-plate connector is to be coupled, wherein the connector body is substantially flat on at least the second side;

a first fastener aperture through the connector body for receiving a first fastener that is coupled to the wall when in an installed position;

a second fastener aperture through the connector body for receiving a second fastener that is coupled to the wall when in an installed position;

a connector extension extending from the first side of the connector body and formed with a plurality of terminal pockets;

a plurality of electrical terminals disposed within the terminal pockets and coupled therein, each electrical terminal having a wire-entrance aperture for receiving an input wire;

wherein the connector extension is formed with a plurality of pin apertures opening into a plurality of pin cavities, each of the plurality of pin apertures for receiving an electrical connection pin from a display unit when in an installed position, and that extends through the corresponding pin aperture of the plurality of pin apertures and into the corresponding pin cavity of the plurality of pin cavities that is electrically coupled to a corresponding electrical terminal of the plurality of electrical terminals; and wherein the connector body is formed with a notch wire chase on a peripheral edge of the connector body.

12. The wall-plate connector of claim 11, further comprising a plurality of alignment posts coupled to and extending from the first side of the connector body.

13. The wall-plate connector of claim 11, further comprising a plurality of barrier walls extending from the first side of the connector body between members of the plurality of terminal pockets.

14. The wall-plate connector of claim 11, wherein the first fastener aperture is oblong in shape.

15. The wall-plate connector of claim 11, further comprising a plurality of terminal-fastener apertures formed through a portion of the connector extension and aligning with a portion of a corresponding electrical terminal of the plurality of electrical terminals to couple a wire therein.

16. The wall-plate connector of claim 11, wherein notch wire chase has a flattened U-shape on a top longitudinal edge.

17. The wall-plate connector of claim 11, wherein the connector body has a first lateral edge and a second lateral edge, and wherein the first lateral edge is formed with a first snap cavity and the second lateral edge is formed with a second snap cavity.

18. The wall-plate connector of claim 11, wherein the first side of the connector body is formed with a wire recess area proximate to the wire-entrance apertures of the plurality of terminals.

19. An HVAC system comprising:

a closed conduit circuit having a refrigerant therein;

a compressor fluidly coupled to the closed conduit circuit;

a condenser fluidly coupled to the closed conduit circuit;

an expansion valve fluidly coupled to the closed conduit circuit;

an evaporator fluidly coupled to the closed conduit circuit;

one or more fans for moving air across the evaporator;

a controller for controlling at least one of the compressor, condenser, expansion valve, or evaporator;

wherein the controller comprises a smart thermostat, wherein the smart thermostat comprises a display unit;

wherein the display unit has a first side and a second side;

wherein the first side of the display unit has a screen for presenting a graphical user interface to a user for receiving control inputs and displaying data;

wherein the second side of the display unit comprises:

a wall-plate-connector recess having a plurality of electrical connection pins extending outward therefrom, a first snap retention wall extending from the second side and having a first lip at a distal end that extends orthogonal to a main portion of the first snap retention wall, and a second snap retention wall displaced from the first snap retention wall and extending from the second side and having a second lip at a distal end that extends orthogonal to a main portion of the second snap retention wall, and wherein the first lip and second lip extend towards each other and are flexible enough to allow a latching motion;

a wall-plate connector comprising:

connector body having a first side and second side, wherein the first side is sized and configured to couple with the display unit, which includes the plurality of electrical connection pins, and the second side is for placing against a wall onto which the wall-plate connector is to be coupled, wherein the connector body is substantially flat on at least the second side, a first fastener aperture through the connector body for receiving a first fastener that is coupled to the wall when in an installed position, a second fastener aperture through the connector body for receiving a second fastener that is coupled to the wall when in the installed position, a connector extension extending from the first side of the connector body and formed with a plurality of terminal pockets, a plurality of electrical terminals disposed within the terminal pockets and coupled therein, each electrical terminal having a wire-entrance aperture for receiving an input wire, wherein the connector extension is formed with a plurality of pin apertures opening into a plurality of pin cavities, each of the plurality of pin apertures for receiving one of the plurality of electrical connection pins from the display unit that extends through the corresponding pin aperture and into the corresponding pin cavity, which is electrically coupled to a corresponding member of the plurality of electrical terminals, wherein the connector body is formed with a notch wire chase on a peripheral edge of the connector body, wherein the connector body has a first lateral edge and a second lateral edge, and wherein the first lateral edge is formed with a first snap cavity and the second lateral edge is formed with a second snap cavity; and wherein, in the installed position, the first lip of the first snap retention wall engages the first snap cavity of the connector body and the second lip of the second snap retention wall engages the second snap cavity of the connector body.

20. The HVAC system of claim 19, further comprising a plurality of alignment posts coupled to and extending from the first side of the connector body and a plurality of barrier walls extending from the first side of the connector body between members of the plurality of terminal pockets.

* * * * *